United States Patent
Miao

(10) Patent No.: US 6,991,479 B2
(45) Date of Patent: Jan. 31, 2006

(54) CONNECTOR LOCK FOR A UNIVERSAL SERIAL BUS PORT

(75) Inventor: Tony Miao, Taishan Hsiang (TW)

(73) Assignee: Jin Tay Industries Co., Ltd., Taishan Hsiang (TW)

( * ) Notice: Subject to any disclaimer, the term of this patent is extended or adjusted under 35 U.S.C. 154(b) by 0 days.

(21) Appl. No.: 10/884,454

(22) Filed: Jul. 2, 2004

(65) Prior Publication Data
US 2005/0202698 A1 Sep. 15, 2005

(30) Foreign Application Priority Data
Mar. 12, 2004 (TW) .............................. 93106665 A

(51) Int. Cl.
*H01R 13/44* (2006.01)
(52) U.S. Cl. .......................... 439/133; 439/352; 70/58
(58) Field of Classification Search ................ 439/133, 439/134, 147–149, 352, 345, 350, 353, 357, 439/358; 70/32–34, 58, 14
See application file for complete search history.

(56) References Cited

U.S. PATENT DOCUMENTS

| | | | | |
|---|---|---|---|---|
| 4,964,284 A | * | 10/1990 | McDaid .......................... 70/14 |
| 5,190,466 A | * | 3/1993 | McVey .......................... 439/133 |
| 5,344,329 A | * | 9/1994 | Faller .......................... 439/133 |
| 6,735,990 B1 | * | 5/2004 | Murray et al. .................. 70/58 |
| 2003/0224637 A1 | * | 12/2003 | Ling .......................... 439/133 |

* cited by examiner

*Primary Examiner*—Tho D. Ta
*Assistant Examiner*—Felix O. Figueroa
(74) *Attorney, Agent, or Firm*—Alan D. Kamrath; Nikolai & Mersereau, P.A.

(57) ABSTRACT

The connector lock for a USB port has a tubular body, a rotatably limit, a lock activator, a plug and a faceplate. Aligning a rotating diametric recess in the rotatable limit with a stationary diametric recess formed in the proximal end of the tubular body allows the tubular lock activator to slide on the tubular body and unlock the connector lock from a USB port. Then the connector lock can be removed from the USB port so the USB port can be used.

4 Claims, 6 Drawing Sheets

CONNECTOR LOCK FOR A UNIVERSAL SERIAL BUS PORT

BACKGROUND OF THE INVENTION

1. Field of the Invention

The present invention relates to a connector lock, especially to a connector lock for a universal serial bus (USB) port.

2. Description of the Prior Arts

Virtually every computer has a universal serial bus (USB) port to accommodate connecting peripheral devices such as portable flash memory cards, which has given rise to the theft of sensitive or confidential data from banks, insurance companies and the like by employees or anyone with access to an organization's computers. Employees or anyone with access to an organization's computers can plug a portable flash memory card into the computer USB port and copy any information in the company's computer to the portable flash memory card. Since portable flash memory cards are usually very small, removing the portable flash memory card from the USB port and taking the portable flash memory card and the company's information out of the company is relatively easy.

Since the loss of proprietary and confidential information such as proprietary product information, trade secrets and confidential client information can be very costly with regard to lost revenue and corporate liability, most companies take significant security precautions to protect against the theft of corporate information. Some companies take extreme and costly measures to keep information in their computers from being downloaded without proper authorization. Therefore, a more convenient means of preventing casual downloading of information is needed.

To overcome the shortcomings, the present invention provides a lock for a USB port to mitigate or obviate the aforementioned problems.

SUMMARY OF THE INVENTION

The main objective of the present invention is to keep unauthorized peripheral devices from being connected to a universal serial bus (USB) port by locking a connector lock onto the USB port to deny physical access to the port.

The connector lock for a USB port in accordance with the present invention comprises a tubular body, a rotatably limit, a lock activator, a plug and a faceplate. Aligning a rotating diametric recess in the rotatable limit with a stationary diametric recess formed in the proximal end of the tubular body allows the tubular lock activator to slide on the tubular body and unlock the connector lock from a USB port. Then the connector lock can be removed from the USB port so the USB port can be used.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
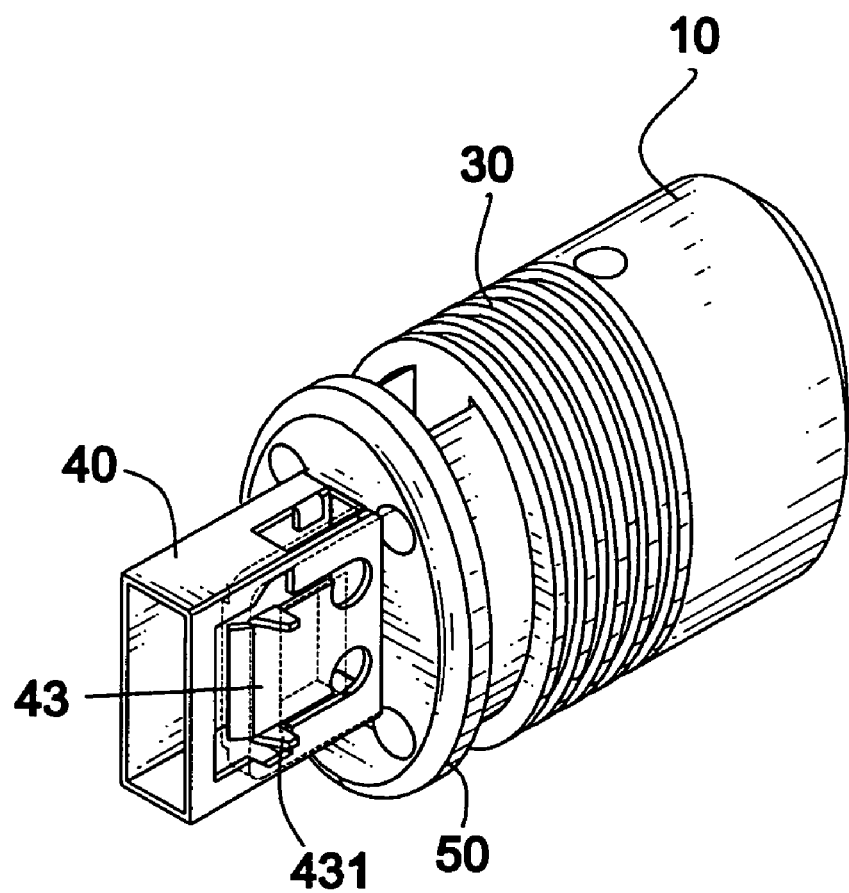
FIG. 1 is a perspective view of a connector lock for a universal serial bus port in accordance with the present invention.
Figure 2:
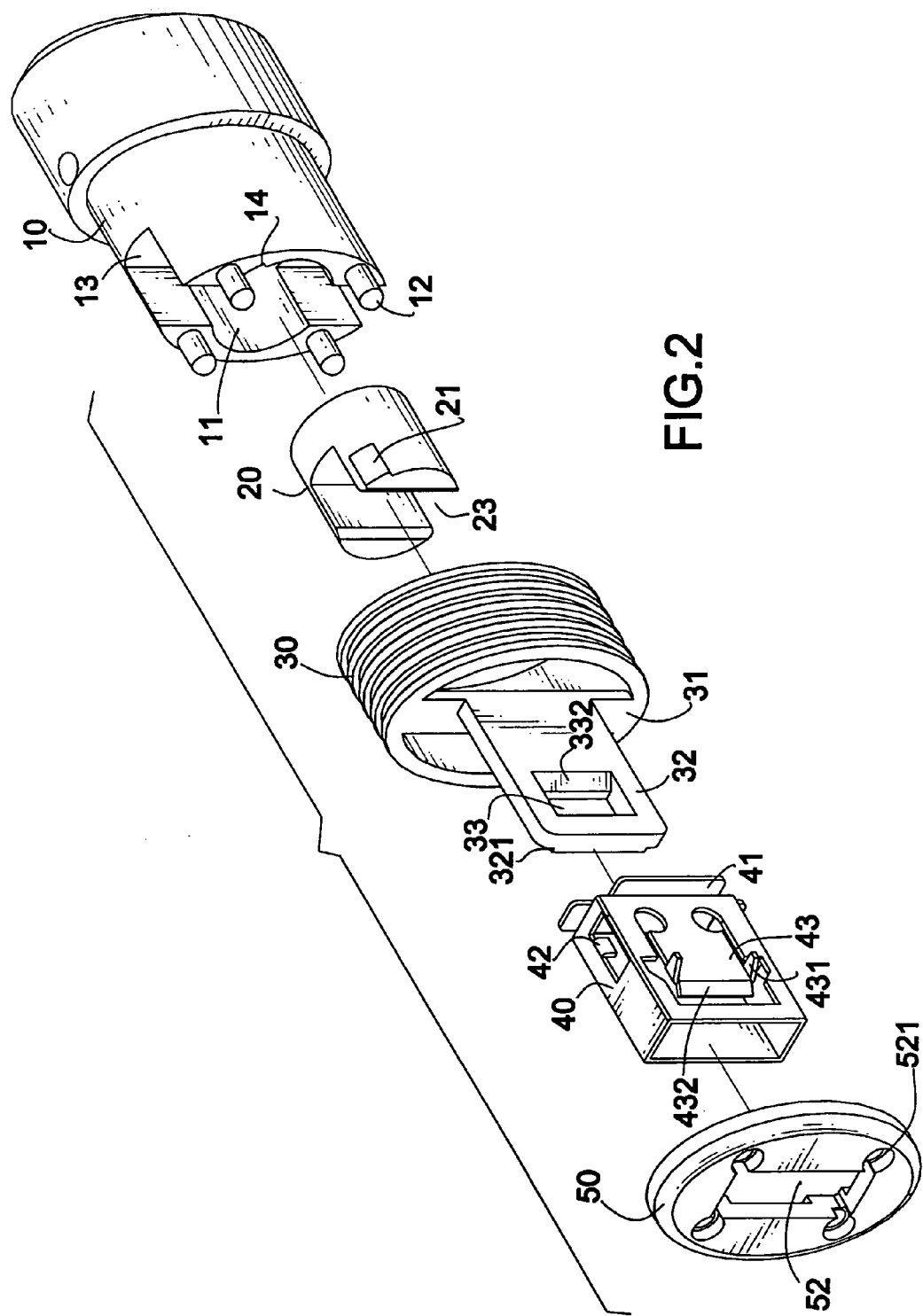
FIG. 2 is an exploded perspective view of the connector lock in FIG. 1.

With reference to FIGS. 1 and 2, a connector lock for a universal serial bus (USB) port comprises a tubular body (10), a rotatable limit (20), a lock activator (30), a plug (40) and a faceplate (50).

Figure 5:
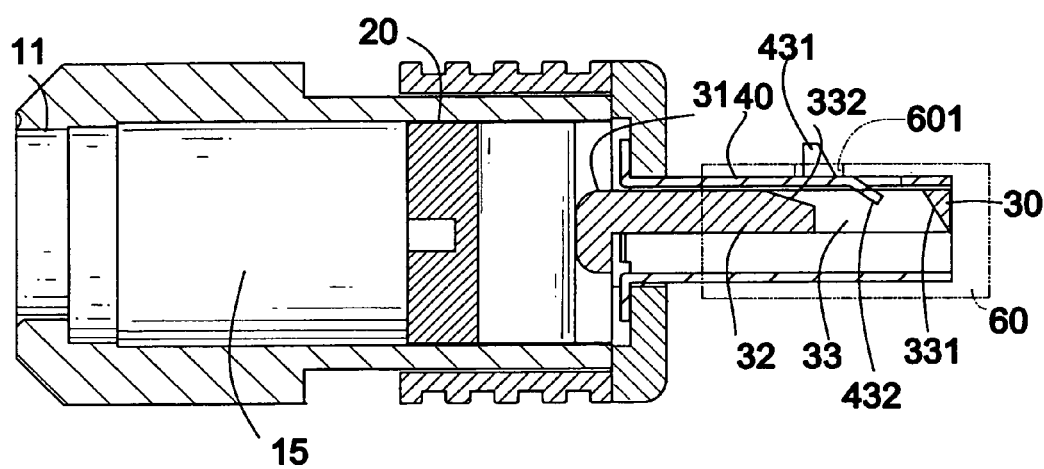
FIG. 5, is a top view in partial section of the connector lock in FIG. 1 with the connector lock locked.

With further reference to FIG. 5, the tubular body (10) has an outside surface, a distal end, a proximal end, a stepped longitudinal hole (11), a lock cylinder (15), a stationary diametric recess (13), a rotation limit (14) and at least two optional mounting posts (12). The outside surface is non-circular. The stepped longitudinal hole (11) is formed axially through the tubular body (10) and has an internal surface and at least one internal annular step near the distal end. The lock cylinder (15) is seated in the stepped longitudinal hole (11) against the internal annular step. The stationary diametric recess (13) is formed in the proximal end. The rotation limit (14) is formed in the internal surface of the stepped longitudinal hole (11) at the proximal end of the tubular body (10). The at least two mounting posts (12) are formed on and protrude longitudinally from the proximal end of the tubular body (10).

Figure 4:
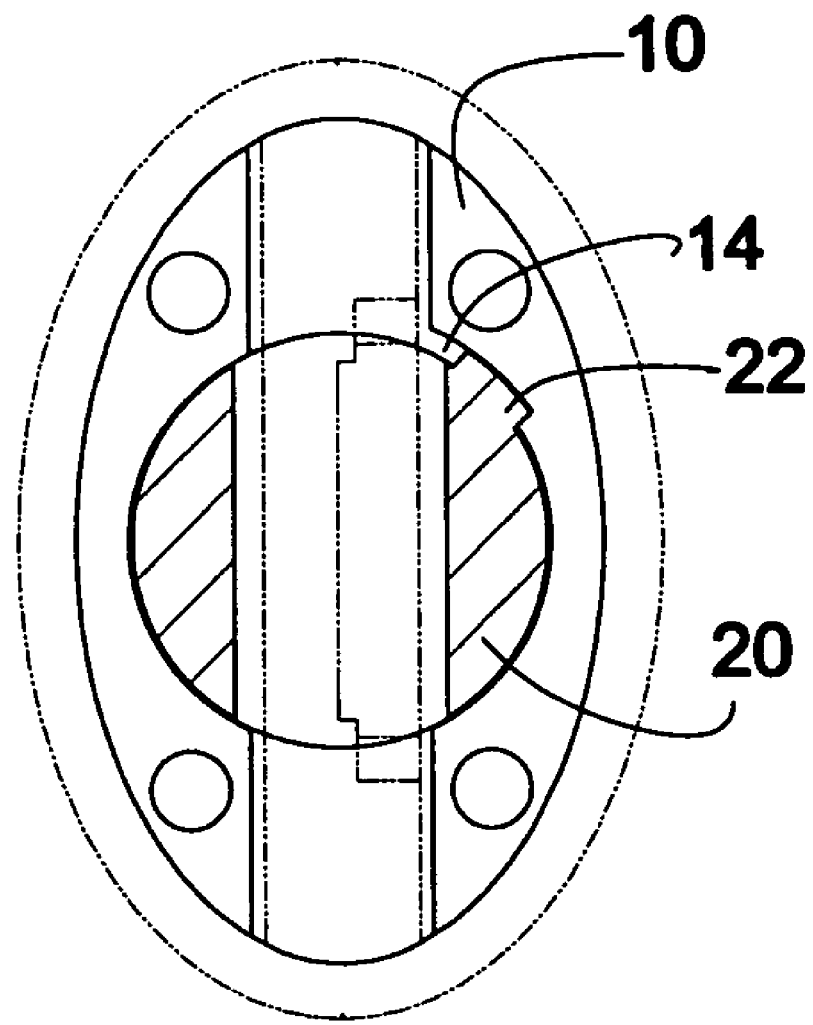
FIG. 4 is a front view in partial section of the assembled tubular body and rotatable limit in the connector lock in FIG. 2 with the connector lock unlocked.

With further reference to FIG. 4, the rotatable limit (20) is seated in the stepped longitudinal hole (11), is attached to the lock cylinder (15), is cylindrical and has an outer end, an inner end, a rotating diametric recess (23), an outer surface and a positive stop (21). The positive stop (21) is formed on and protrudes from the outside surface at the outer end and corresponds to the rotation limit (14) in the tubular body (10) when the rotating diametric recess (23) is aligned with the stationary diametric recess (13).

The lock activator (30) is tubular, is mounted slidably around the proximal end of the tubular body (10) and has an inside surface, an outer end, an inner end, a transverse bar (31) and a latch activator (32). The inside surface corresponds to the outside surface of the tubular body (10). The transverse bar (31) is formed across the outer end and is aligned with the stationary diametric recess (13) in the tubular body (10). The latch activator (32) has two sides, a top edge, a bottom edge, a proximal end, a distal end, two grooves (321) and a drive hole (33). The proximal end of the latch activator (32) is attached to the transverse bar (31). The grooves (321) are formed on one side of the latch activator (32) respectively at the top and bottom edges of the latch activator (32). The drive hole (33) is formed through the latch activator (32) near the distal end and has a front edge, a rear edge, a front inclined surface (331) and a rear inclined surface (332). The front inclined surface (331) is formed on the front edge of the drive hole (33). The rear inclined surface (332) is formed on the rear edge of the drive hole (33). The front and rear inclined surfaces (331, 332) are inclined so the surfaces (331, 332) face opposite sides of the latch activator (32) and the rear inclined surface (332) faces away from the side with the grooves (321).

The plug (40) is hollow, is mounted slidably around the latch activator (32) of the rotatable limit (30) and has a proximal end, a distal end, two narrow sides, multiple optional mounting tabs (41), two retainers (42) and a resilient latch tongue (43). The mounting tabs (41) are formed around and extend out from the proximal end of the plug (40). The retainers (42) are formed on and extend in respectively from the narrow sides of the plug (40) near the proximal end and correspond to and slide in the grooves (321) in the latch activator (32). The resilient latch tongue (43) is formed in the plug (40) between the narrow sides of the plug (40) and has a proximal end, two side edges, an inclined distal surface (432) and two protruding latches (431). The proximal end of the resilient latch tongue (43) is formed with the plug (40). The inclined distal surface (432) has an inside surface and an outside surface. The rear inclined surface (332) in the drive hole (33) in the latch activator (32) presses against the inside surface of the inclined distal surface (432) when the latch activator (32) is inserted into the plug (40). The front inclined surface (331) in the drive hole (33) in the latch activator (32) presses against the outside surface of the inclined distal surface (432) and bends the resilient latch tongue (43) inward when the latch activator (32) is drawn out of the plug (40). The protruding latches (431) are formed on and extend out respectively from the side edges of the resilient latch tongue (43) near the inclined distal surface (432).

Figure 3:
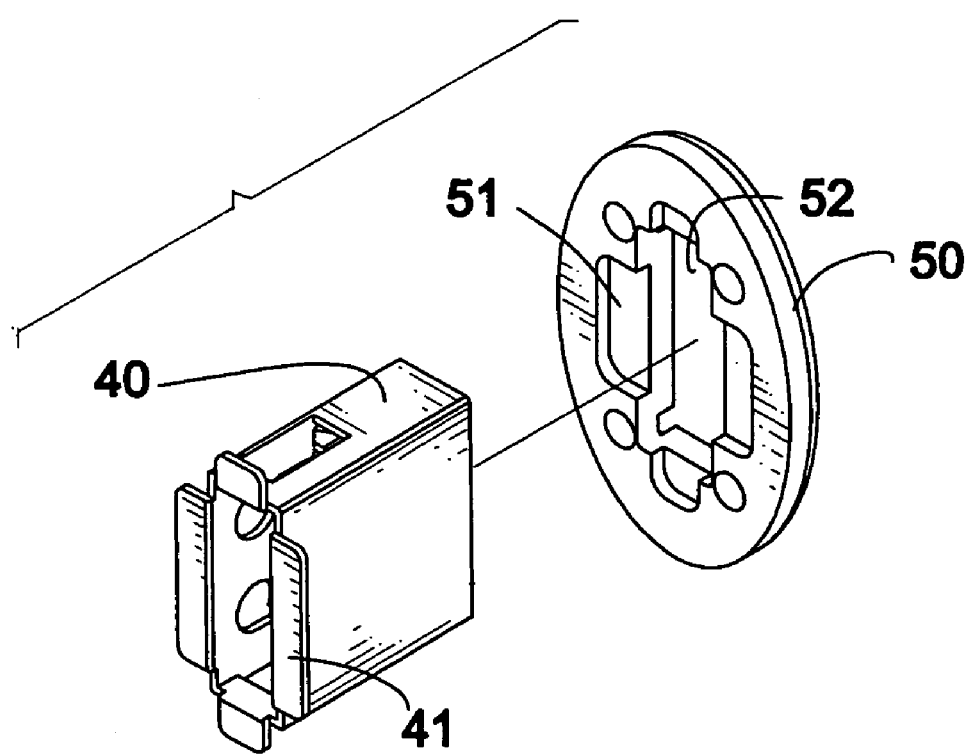
FIG. 3 is an exploded perspective view of a plug and a faceplate of the connector lock in FIG. 1.

With further reference to FIGS. 3 and 4, the faceplate (50) is connected around the proximal end of the plug (40), is attached to the proximal end of the tubular body (10) and has an inside surface, a through hole (52) and optional recesses (51). The through hole (52) is formed through the faceplate (50) and has four optional corners and optional holes (521). The holes (521) are formed respectively in the corners and correspond to the at least two mounting posts (12) on the tubular body (10). The at least two mounting posts (12) pass through the lock activator (30) and are attached the corresponding holes (521) in the faceplate (50). The recesses (51) are formed around the through hole (52) and correspond respectively to the mounting tabs (41) on the plug (40).

With further reference to FIG. 5, the connector lock for a USB port is locked in a USB port (60). The USB port (60) has latch holes (601) corresponding to the protruding latches (431) on the resilient latch tongue (43). The protruding latches (431) engage the latch holes (601). The rotatable limit (20) is rotated by the lock cylinder (15) in the tubular body (10). When the rotating diametric recess (23) is not aligned with the stationary diametric recess (13), the lock activator (30) cannot move backward, and the resilient latch tongue (43) is held in a locked position by the latch activator (32). The connector lock cannot be removed from the USB port (60). Then the USB port (60) cannot be used.

Figure 6:
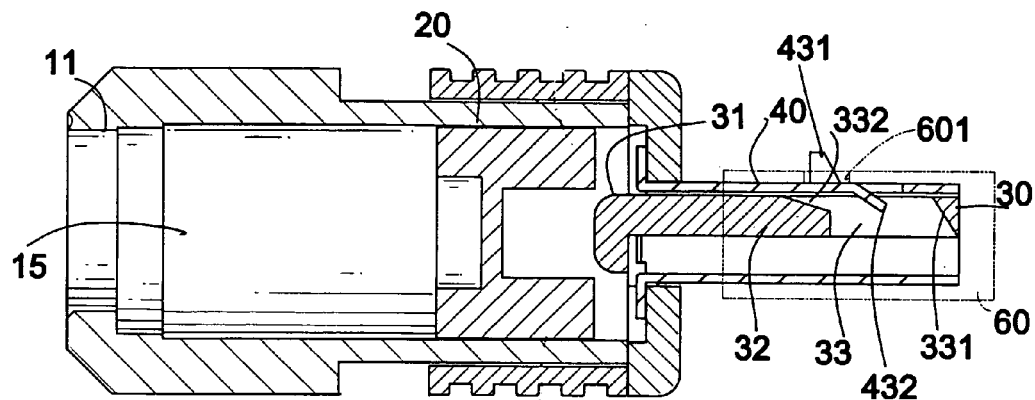
FIG. 6 is a top view in partial section of the connector lock in FIG. 1 with the latch activator pressing the resilient latch tongue outward.
Figure 7:
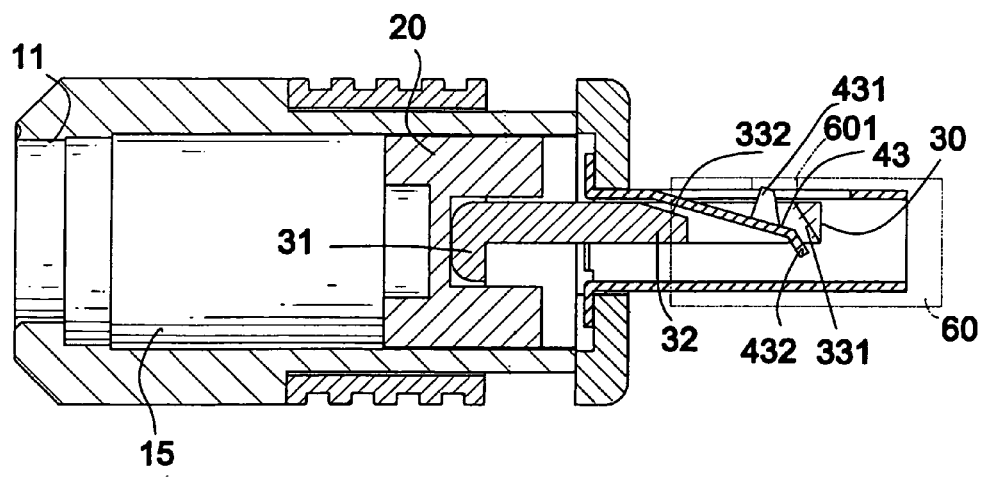
FIG. 7 is a top view in partial section of the connector lock in FIG. 1 with the latch activator retracted from the plug.

With further reference to FIGS. 6 and 7, the connector lock for a USB port is unlocked by rotating the rotatable limit (20) with the lock cylinder (15) in the tubular body (10). When the rotating diametric recess (23) is aligned with the stationary diametric recess (13), the lock activator (30) can move backward. When the lock activator (30) moves backward, the front inclined surface (331) of the lock activator (30) pulls the inclined distal surface (432) of the plug (40), and the resilient latch tongue (43) of the plug (40) is bent inward. The protruding latches (431) disconnect from the latch holes (601) in the USB port (60) as the resilient latch tongue (43) bends inward. The connector lock can be removed from the USB port (60). Then the USB port (60) can be used.

The connector lock as described has numerous advantages. The connector lock easily locks and prevents use of any USB port and is easily unlocked and removed with the proper key. When the connector lock locks the USB port, the USB port cannot be used to extract information from the computer. A key for the lock cylinder can be used to remove the connector lock and unlock the USB port anytime. Company security then comprises simply controlling access to the key.

Even though numerous characteristics and advantages of the present invention have been set forth in the foregoing description together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A connector lock for a universal serial bus port comprising
    a tubular body having
        an outside surface;
        a distal end;
        a proximal end;
        a stepped longitudinal hole formed axially through the tubular body and having an internal surface and at least one internal annular step near the distal end;
        a lock cylinder seated in the stepped longitudinal hole against the internal annular step;
        a stationary diametric recess formed in the proximal end; and
        a rotation limit formed in the internal surface of the stepped longitudinal hole at the proximal end of the tubular body;
    a rotatable limit seated in the stepped longitudinal hole, attached to the lock cylinder, being cylindrical and having
        an outer end;
        an inner end attached to the lock cylinder;
        a rotating diametric recess selectively aligned with the stationary diametric recess in the tubular body;
        an outer surface; and
        a positive stop formed on and protruding from the outside surface at the outer end and corresponding to the rotation limit in the tubular body;
    a lock activator being tubular, mounted slidably around the proximal end of the tubular body and having
        an inside surface;
        an outer end;
        an inner end;
        a transverse bar formed across the outer end and aligned with the stationary diametric recess in the tubular body; and
        a latch activator attached to the transverse bar and having
            two sides;
            a top edge;
            a bottom edge;
            a proximal end attached to the transverse bar;
            a distal end;
            two grooves formed on one side of the latch activator respectively at the top and bottom edges; and
            a drive hole formed through the latch activator near the distal end and having
                a front edge;
                a rear edge;

a front inclined surface formed on the front edge of the drive hole; and a rear inclined surface formed on the rear edge of the drive hole wherein the front and rear inclined surfaces are inclined so the surfaces face opposite sides of the latch activator and the rear inclined surface faces away from the side with the grooves;

a plug being hollow, mounted slidably around the latch activator of the rotatable limit and having;

a proximal end;

a distal end;

two narrow sides;

two retainers formed on and extending in respectively from the narrow sides of the plug near the proximal end and corresponding to and sliding in the grooves in the latch activator; and a resilient latch tongue formed in the plug between the narrow sides of the plug and having a proximal end formed with the plug;

two side edges;

an inclined distal surface having an inside surface and an outside surface; and two protruding latches formed on and extending out respectively from the side edges of the resilient latch tongue near the inclined distal surface;

a faceplate connected around the proximal end of the plug, attached to the proximal end of the tubular body and having an inside surface; and a through hole formed through the faceplate.

2. The connector lock as claimed in claim 1, wherein the tubular body further comprises at least two mounting posts formed on and protruding longitudinally from the proximal end of the tubular body; and the through hole in the faceplate has four corners and at least two of the corners of the through hole in the faceplate have holes formed respectively in the corners and corresponding to the at least two mounting posts on the tubular body wherein the at least two mounting posts pass through the lock activator and attach to the corresponding holes in the faceplate.

3. The connector lock as claimed in claim 2, wherein the plug further comprises multiple mounting tabs formed around and extending out from the proximal end of the plug; and the faceplate further comprises multiple recesses formed around the through hole and corresponding respectively to the mounting tabs on the plug.

4. The connector lock as claimed in claim 3, wherein the outside surface of the tubular body is non-circular; and the inside surface of the latch activator corresponds to the outside surface of the tubular body.

* * * * *